United States Patent [19]

Nurczyk et al.

[11] Patent Number: 4,689,801
[45] Date of Patent: Aug. 25, 1987

[54] MICROPROCESSOR FSK DATA COMMUNICATIONS MODULE

[75] Inventors: Mark E. Nurczyk, Eastman; Patrick J. Wilson, La Crosse; Tony J. Wood, West Salem, all of Wis.

[73] Assignee: American Standard Inc., New York, N.Y.

[21] Appl. No.: 540,220

[22] Filed: Oct. 11, 1983

[51] Int. Cl.$^4$ .................. H04B 1/38; H04L 27/10
[52] U.S. Cl. ........................................................ 375/9
[58] Field of Search .................. 375/62, 45, 9, 8, 7; 455/84

[56] References Cited

U.S. PATENT DOCUMENTS

| | | | |
|---|---|---|---|
| 3,219,931 | 11/1965 | Lennon, III et al. | 455/84 |
| 3,752,922 | 8/1973 | Burke | 178/66 R |
| 4,090,135 | 5/1978 | Farstad et al. | 375/62 |
| 4,263,670 | 4/1981 | Sherman | 375/9 |
| 4,328,554 | 5/1982 | Mantione | 375/62 |
| 4,425,665 | 1/1984 | Stauffer | 375/45 |
| 4,462,009 | 7/1984 | Landt et al. | 455/84 |
| 4,468,792 | 8/1984 | Baker et al. | 375/45 |
| 4,475,216 | 10/1984 | Noguchi | 375/45 |
| 4,481,642 | 11/1984 | Hanson | 375/62 |

FOREIGN PATENT DOCUMENTS

| | | |
|---|---|---|
| 0067395 | 12/1982 | European Pat. Off. . |
| 0066076 | 12/1982 | European Pat. Off. . |
| 2003704A | 3/1979 | United Kingdom . |

OTHER PUBLICATIONS

"Bit–Slice Microprocessors in H.f. Digital Communications", by S. D. Smith et al., The Radio and Electronic Engr., vol. 51, No. 6, pp. 299-301, Jun. 1981.
"Modem Modules Create First Time Designs that Last", Electronic Design, vol. 29, No. 8, Apr. 16, 1981.
"A 1200 B/S Single Chip Microcomputer Data Modem", P. J. Stein et al., I.C.C. Loughborough, Leics, England, 7-10 Apr. 1981.
"Data Modem Evolution", Electrical Communication, vol. 57, No. 3, pp. 187-194, 1982.

Primary Examiner—Douglas W. Olms
Assistant Examiner—Kenneth I. Rokoff
Attorney, Agent, or Firm—Ronald M. Anderson; William J. Beres; Robert J. Harter

[57] ABSTRACT

A microprocessor-based frequency shift keying (FSK) data communications module. The microprocessor selectively modulates and demodulates data directly in terms of a square wave pulse train in which a first frequency is used to convey a binary "1" and a second frequency to convey a binary "0". An input and an output port on the microprocessor are selectively coupled to a transmission line through a transformer, by means of electronic switches. Also included are a bandpass filter for shaping the square waves into sine waves and for filtering noise, and means including a notch filter for generating a carrier detect signal input to the microprocessor, when incoming data is detected on the transmission line. Many of the components in the module are used for both transmitting and receiving data.

20 Claims, 4 Drawing Figures

MICROPROCESSOR FSK DATA COMMUNICATIONS MODULE

DESCRIPTION

1. Technical Field

This invention generally pertains to a data communications device and specifically, to a module for transmitting and receiving data in a frequency shift keying mode.

2. Background Art

There are many applications in which it is necessary that physically separated digital devices or controls exchange data over a transmission line that interconnects the devices. Of the various communication techniques available, frequency shift keying (FSK) is more commonly used due to its relative simplicity. FSK is a method for data communication wherein the data comprises pulses at a first frequency to represent a binary "1" and at a second, substantially different frequency, to represent a binary "0". Usually a sine wave source is modulated between the two frequencies by a circuit comprising many discrete components to encode data on a carrier signal. At the receiving end, the carrier signal is demodulated to decode the digital data, using a different circuit, again comprising numerous discrete components.

The sine wave source is typically referenced to one or two crystal oscillators that oscillate at relatively high frequencies. These higher frequencies are divided down to the required carrier frequencies. However, it is necessary to synchronize the data signals with the modulator to avoid phase distortion at the time of crossover between the two carrier frequencies, i.e., at the transition between a "0"and a "1" in the data stream. Phase distortion can introduce errors when the FSK signal is demodulated.

This problem is addressed in U.S. Pat. No. 3,752,922. As disclosed in this patent, a logic circuit is used with a single crystal controlled source to provide a time period for the pulse wave form being applied to the output circuit to change during the time of frequency shift, thereby minimizing distortion of the wave form at the time of crossover. The frequency source comprises two generators, the first being a crystal controlled square wave generator, and the second a signal generator that synchronizes the crystal controlled generator with the information being transmitted. The resulting square waves are converted to sine waves using an active filter. At the transition point for frequency changeover, this circuit either lengthens the first half cycle or shortens the last half cycle of the carrier frequency. This technique keeps phase distortion at a low level, but may make it difficult for a demodulator to determine a precise point where a bit transition has occurred in the data stream.

The relative complexity of the circuitry disclosed for the transmit-only device shown in the '922 patent is generally typical of the prior art. None of the prior art discloses a circuit in which common components are used to both modulate and demodulate FSK data. In applications such as energy management systems, data communications between many digital devices require a simple, low-cost communications module to be cost effective. Such a module must also be reliable and should have relatively few components.

It is therefore an object of this invention to provide a communications module for modulating and demodulating digital data in an FSK format.

A further object of this invention is to eliminate phase distortion in an FSK data signal at transition between "0" and "1" bits.

Yet a further object of this invention is to use many of the same components for both modulating and demodulating data in an FSK format.

A still further object of this invention is to provide a data communications module that is low in cost, and general in application.

These and other objects of the invention will be apparent from the attached drawings and the description of the preferred embodiment contained hereinbelow.

DISCLOSURE OF THE INVENTION

The present invention is an FSK data communications module for receiving and transmitting FSK data on a transmission line. The module comprises a microprocessor for modulating and demodulating data that are respectively transmitted and received in an FSK format on the transmission line, through an output and an input port on the microprocessor. Also included are means operative to selectively couple one of the input and output ports to the transmission line, and means for switching the coupling means between the input port and the output port.

When an incoming FSK data signal is present on the transmission line, carrier detection means are operative to generate a carrier-detect signal that is input to the microprocessor. The microprocessor responds by operating the module in a receiving mode to demodulate the signal.

A bandpass filter is provided to filter out unwanted noise in the receiving mode, and to provide wave-shaping of the output signal when in the transmitting mode. A summing amplifier in combination with the bandpass filter comprises a notch filter for use in detecting the presence of a carrier signal on the transmission line.

DESCRIPTION OF THE PREFERRED EMBODIMENT

Figure 1:
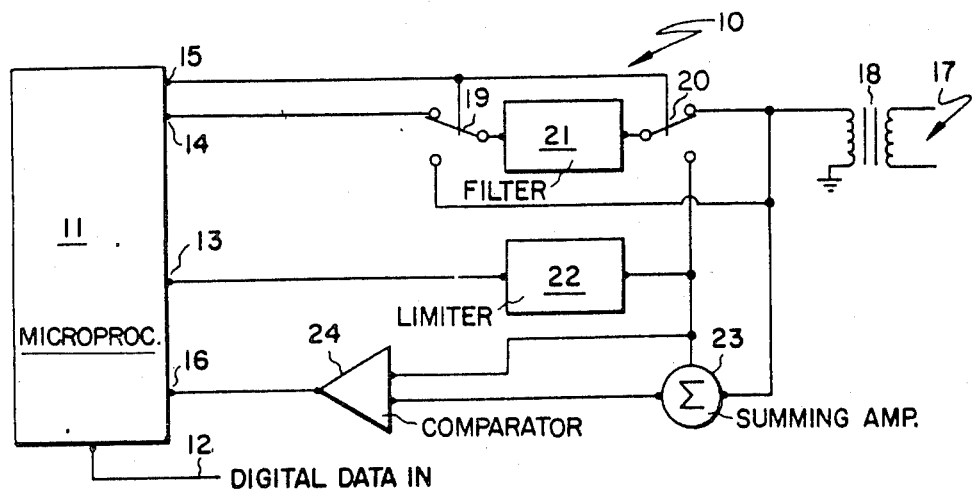
FIG. 1 is a block diagram showing the major component parts comprising the present invention.

With reference to FIG. 1, the data communications module is generally represented by reference numeral 10. The module is shown in block format in this figure, with microprocessor 11 being connected in the circuit to modulate and demodulate data in a frequency shift keying (FSK) format. Data that is transmitted might be generated by other functional programs internal to microprocessor 11; however, in the preferred embodiment, digital data are input and output the microprocessor 11 via data lines 12. Data lines 12 may comprise either a serial or parallel port, and if serial, require only two conductors for data communication. A parallel port might use either four or eight conductors. Data lines 12 are used for transfer of digital data to and from an external local device such as another microprocessor (not shown). Such data are either received or transmitted by data communication module 10 in communication with a related distant device (also not shown). Data that are received either from the distant source, or from the local source via data lines 12, is temporarily stored in an internal random access memory (RAM), including 128 bytes capacity. The RAM storage is a buffer area that holds a message until it may be re-transmitted. In the preferred embodiment, microprocessor 11 is manufactured by the Nippon Electric Company, and is a model NEC80C49. Many other microcomputers would be suitable for this purpose.

Data coming from a remotely located source enter microprocessor 11 via an input port 13. The microprocessor is programmed to determine the frequency of the incoming square wave and to interpret the data as a series of binary bits. Conversely, microprocessor 11 is also programmed to generate square wave pulses in an FSK format for transmission through an output port 14, to a remotely located receiver. An additional output port 15 sources a switch-select signal that effects operation of the module 10 selectively in a receive or transmit mode. An input port 16 provides for input of a signal for a vectored interrupt to alert microprocessor 11 that an FSK signal is incoming on a transmission line 17 so that the microprocessor demodulation mode may be selected.

Signals present on transmission line 17 are in the FSK format comprising sine wave pulses of two different carrier frequencies. The data transmitted on the line convey digital information of a binary nature, comprising "1's" and "0's" (marks and spaces), wherein one carrier frequency is used to represent a "1" and the other frequency, a "0". Transmission line 17 interfaces with module 10 through an input/output transformer 18 which electrically isolates the module circuitry from the transmission line, and in addition provides impedance matching between the circuitry of module 10 and the transmission line 17. When microprocessor 11 is ready to transmit data in the FSK format, a signal is output from switch select port 15 to electronic switches 19 and 20. Switches 19 and 20 allow the square wave signal output from port 14 to pass to the input of a bandpass filter 21 and from its output, to transformer 18. Bandpass filter 21 acts on the square wave signals generated by microprocessor 11, forming them into sine wayes at the two carrier frequencies. In the preferred embodiment, a carrier frequency of 1205 hertz is used to represent a "0" bit, with eight half-cycles of the carrier frequency per bit in the data stream. A carrier frequency of 2251 hertz is used for a "1" bit, with fifteen half-cycles of carrier per bit. This yields baud rates of 301.3 and 300.2, respectively, approximating the nominal 300 baud standard commonly used on telephone data modems.

The "normal" state for electronic switches 19 and 20 is in the opposite position from that shown in FIG. 1, i.e., in the receive mode. Data incoming on transmission lines 17 pass through transformer 18 and is input (with other noise present on the line) through the bandpass filter 21. Filter 21 substantially reduces unwanted noise at frequencies below 1 kilohertz and above 2.4 kilohertz. The filtered output is applied to the input of zero crossing detector 22 which converts the sine wave carrier signal to a square wave at an amplitude that may be applied to input port 13 on microprocessor 11. The filtered signal is also applied to summing amplifier 23 along with the unfiltered signal from transformer 18.

Together bandpass filter 21 and summing amplifier 23 comprise a notch filter, whose output is applied to a comparator 24. The output of the notch filter is compared in amplitude to the output of bandpass filter 21 to determine if a signal level within the desired pass band frequencies of filter 21 is present on transmission lines 17. Assuming the presence of an inband signal, the output of comparator 24 is applied to input port 16, causing microprocessor 11 to enter the receive, or demodulating mode. Signals incoming on port 13 are thus translated into binary data for storage in internal RAM and subsequent transmission via data lines 12 to a local digital device.

Figure 2:
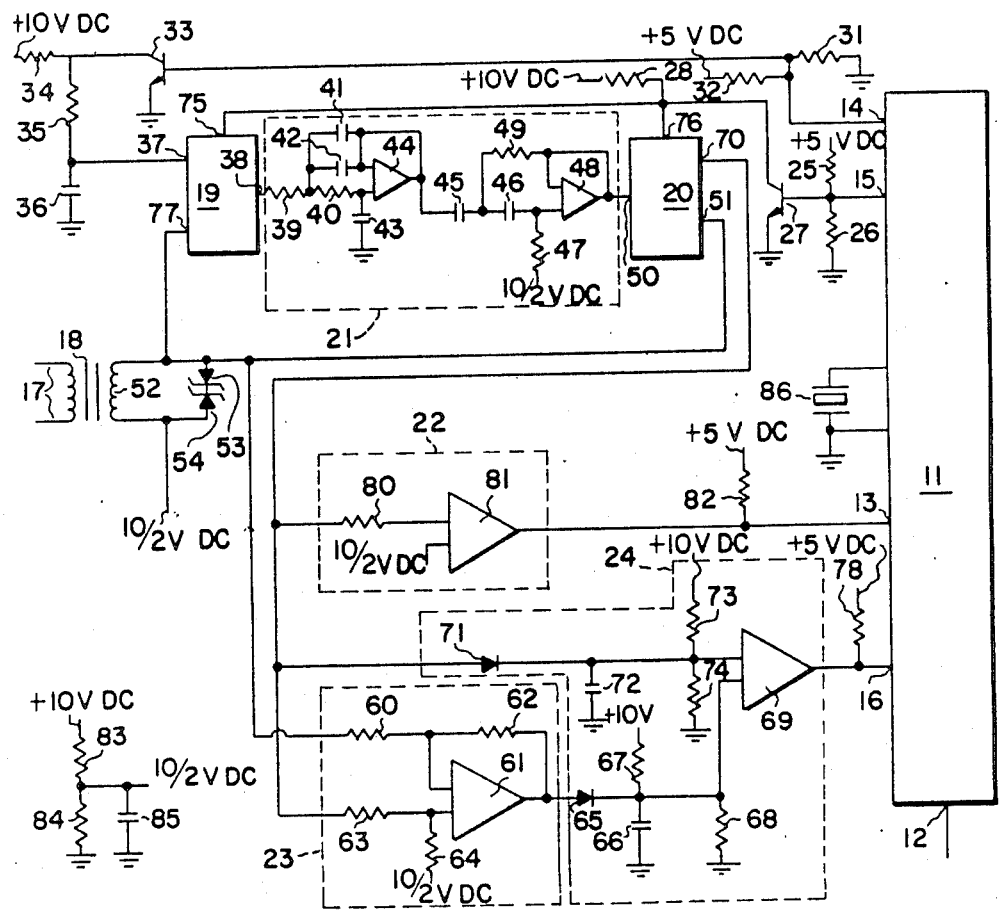
FIG. 2 is a schematic diagram of the data communications module.

Turning now to FIG. 2, the block diagram of FIG. 1 is set forth in a more detailed electronic schematic showing the component parts that comprise the preferred embodiment of module 10. Output port 14 is connected at the common junction of two resistors 31 and 32 of equal resistance, which at their opposite ends are connected between a +5 volt power source and ground. Output port 14 is an "open collector" type, and requires a pull-up resistor. A square-wave pulse train generated by microcomputer 11 varies between approximately 0.7 volts and ground, as a result of the arrangement of resistors 31 and 32 and transistor 33. Transistor 33 saturates in a conducting state when the input impedance at output port 14 goes high at each half cycle of the square wave. Two resistors 34 and 35 are connected to the collector of transistor 33 with the other end of resistor 34 being connected to a 10 volt DC power supply. The opposite end of resistor 35 is connected both to capacitor 36 and the input 37 of electronic switch 19. Capacitor 36 is thus subjected to a charging potential from a 10 volt source when transistor 33 is not conducting, and is discharged through resistor 35 and transistor 33 when it is conducting. The square wave output from microprocessor 11 at port 14 results in a ramp voltage across capacitor 36 that alternately charges and discharges it according to the frequency of the square wave output. The charging voltage level on capacitor 36 in turn is conducted through electronic switch 19 when the switch is in the transmit mode and appears on the output terminal 38 where it is applied to resistor 39 on the input of the bandpass filter 21.

Bandpass filter 21 comprises a two-pole low pass section and a two-pole high pass section connected in series. In the two-pole low pass section, resistors 39 and 40, and capacitors 41, 42, and 43 are connected to the inverting and non-inverting inputs of operational amplifier (op-amp) 44. The values of these capacitors and resistors are selected to allow frequencies below the upper cutoff frequency to pass through op-amp 44 to its output. The output of op-amp 44 is coupled via capacitor 45 and capacitor 46 to the non-inverting input of op-amp 48. Resistors 47 and 49 in combination with capacitors 45 and 46 are selected to permit op-amp 48 to function as a high pass filter such that frequencies above the lower cutoff frequency are allowed to pass to the output of op-amp 48. The output from bandpass filter 21 is applied to input 50 of electronic switch 20. The filtered signal passes through to the terminal 51 of electronic switch 20 to winding 52 of transformer 18. Two Zener diodes 53 and 54 are connected back-to-back across winding 52, and serve to limit the voltage levels across the winding to less than 12 volts for the protection of the circuitry in module 10. The other side winding 52 is referenced to a 10/2 volt level from the DC power supply. Sine waves from terminal 51 of electronic switch 20 are thus referenced to the 10/2 volt level and range between 0 and 10 volts relative to ground potential. Transformer 18 applies this carrier signal to transmission line 17 for transmission to a remotely located device.

Electronic switches 19 and 20 are placed in the transmit mode by a signal from output port 15, as noted above. The output port 15 is current sinking and requires resistors 25 and 26 connected between the 10/2 VDC source and ground to bias the base of a transistor 27 when port 15 is high. This causes the transistor to conduct current from the 10 VDC source through resistor 28, dropping the signal level at inputs 75 and 76 on electronic switches 19 and 20.

When data are incoming on transmission lines 17, the signal passes through transformer 18 and appears on winding 52 as a sine wave pulse train. Since the normal condition of electronic switches 19 and 20 is in the receive mode, the incoming sine wave signal is input to the terminal 77 of electronic switch 19, and after passing through, exits on the output terminal 38 where it enters bandpass filter 21 through resistor 39 as previously explained. In the receive mode, bandpass filter 21 functions to eliminate noise outside the desired bandpass range while allowing the two desired frequencies 1205 hertz and 2251 hertz to pass through with minimal attenuation. The output from bandpass filter network 21 is applied to terminal 50 of electronic switch 20 and exits through terminal 70 which is connected to input resistor 80 of op-amp 81.

Resistor 80 and op-amp 81 comprise zero crossing detector 22 which functions to convert a sine wave ranging between the "0" and "10" volt level and centered at a 10/2 volt reference point to a square wave ranging between 0 and 5 volts. This is accomplished by comparing the signal input through resistor 80 to inverting input of amplifier 81 to a 10/2 volt signal applied to the non-inverting input. The output of amplifier 81 is of the open collector type, and is connected through a resistor 82 to a 5 volt DC supply. Resistor 82 acts as a pull-up resistor, such that input port 13 sees a square wave in the "0" to "5" volt range.

The output from terminal 70 is also applied through resistor 63 to the non-inverting input of summing amplifier 61. Resistor 64 which is equal in value to resistor 63 is connected from this terminal to 10/2 VDC. The unfiltered signal from winding 52 is connected to the inverting input of summing amplifier 61 through resistor 60. A feedback resistor 62 connects the output of this amplifier to the inverting input.

Amplifier 61 in combination with bandpass filter 21 comprises a notch filter with a resonant frequency equal to that of bandpass filter 21. The notch filtering function is achieved by suning the bandpass filtered signal and the non-filtered signal from winding 52. At the resonant frequency, the filtered and unfiltered signals completely cancel each other due to a 180° phase shift in the filtered signal. Since the two carrier frequencies are offset to either side of the resonant frequency of bandpass filter 21, they are shifted in phase by other than 180 degrees relative to the unfiltered signal, and if present on winding 52, appear at the output of amplifier 61 at an attenuated level. Out of hand noise is not attenuated at all. This output is rectified by diode 65 and filtered to an average DC level by capacitor 66. The filtered DC is input the non-inverting input of comparator 69, which is also connected to ground through resistor 68. Resistor 68 serves to discharge capacitor 66 by bleeding charge to ground, when no signal is present on the output of op-amp 61.

The filtered signal from terminal 70 is also applied through diode 71 which half-wave rectifies it, to one side of capacitor 72. The charge on capacitor 72 represents the average DC voltage of the filtered signal. Resistors 73 and 74 are of equal value and are connected between the 10 volt supply and ground. They serve to bias the inverting input of comparator 69 to a 5 volt level. Capacitor 72 is discharged through resistor 74 when no signal is incoming through diode 71. The comparator circuit 24 thus compares the filtered signal with the output from the notch filter, i.e., the output from summing amplifier 23, and acts to sink current from a pull-up resistor 78 that is connected between the 5 volt DC supply and input port 16, when the signal level on the inverting input is higher than the signal level on the non-inverting input of comparator 69. The drop in voltage level at input port 16, causes microprocessor 11 to enter the demodulation or receive mode, whereby it responds the square wave signal being applied at input port 13. In the event that excessive noise is present on transmission line 17, the average DC voltage applied to the non-inverting input of comparator 69 is higher than the average DC voltage applied from bandpass filter 21 to the inverting input. This imbalance prevents the comparator from sinking current from the 5 volt DC source through resistor 78, thereby keeping the DC voltage applied to input port 16 at a 5 volt level. This DC level applied to input port 16 prevents the microprocessor 11 from entering the receive mode when excessive noise on transmission line 17 would interfere with the reception of valid data.

The 10/2 volt level shown at various points in FIG. 2 is derived from the voltage divider circuit comprising resistors 83 and 84 that are connected between 10 volts DC and ground. The common connection of resistors 83 and 84 is in turn connected across capacitor 85, and the other side of which is referenced to ground. Capacitor 85 is provided as a filter for this DC voltage. The 5 and the 10 volt DC supplies are provided from a DC source that is not shown in the schematic. Such DC power supplies are well known to those skilled in the art and need not be discussed further herein.

Figure 3:
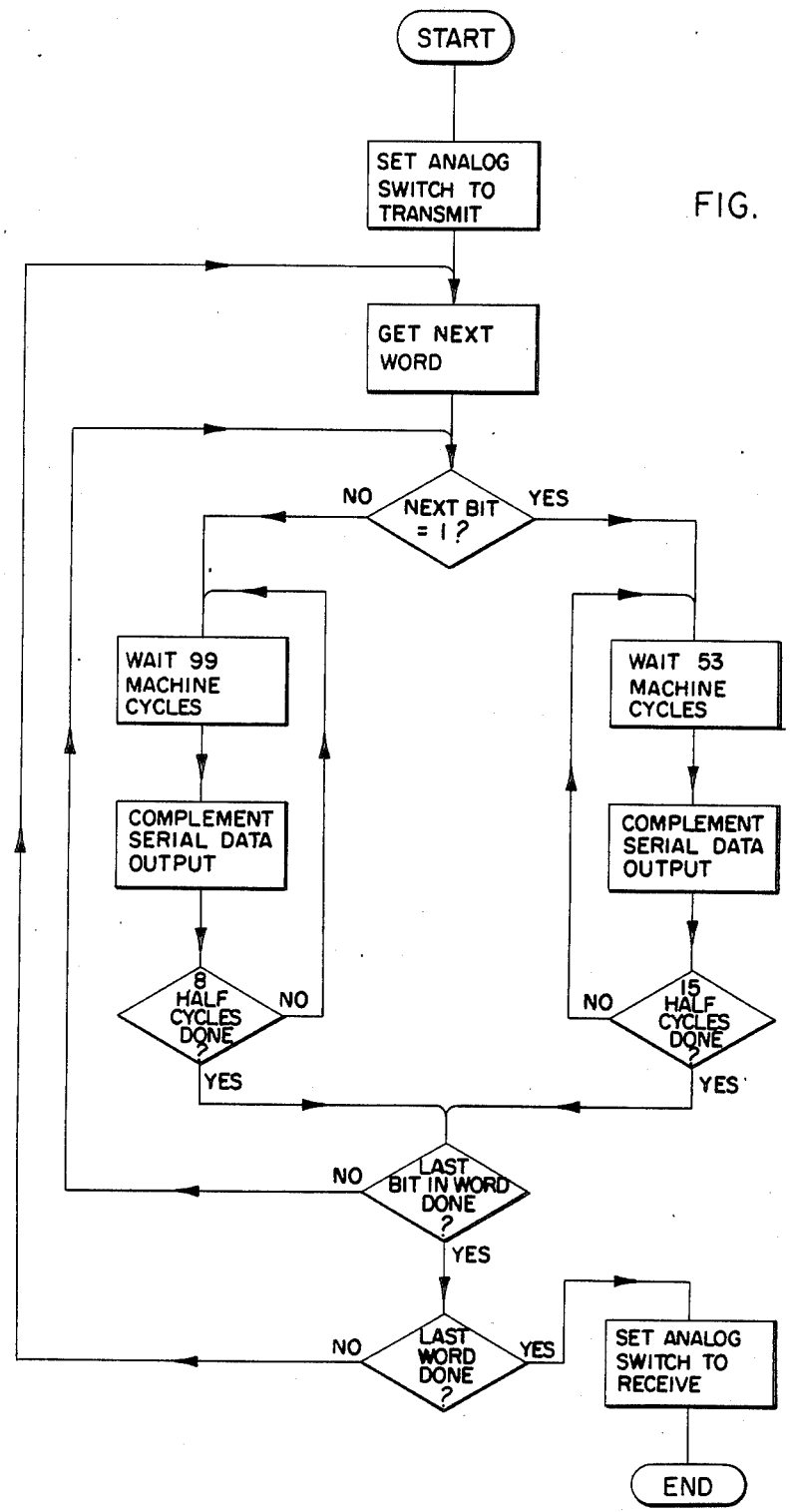
FIG. 3 is a flow chart illustrating the control logic used by the microprocessor in modulating data.

The functions performed by microprocessor 11 in carrying out the modulation and demodulation of data for transmission and reception in the FSK format are stored within an internal read-only memory (ROM), along with other functions that the microprocessor is intended to handle. With reference to FIG. 3, the logic required to implement the modulation of binary data to a square wave format is shown in a flow chart. The transmit mode is initiated in response to other instructions, either internally generated by microprocessor 11, or coming from an external device. When data is to be transmitted, the logic for transmit mode sets the analog switches 19 and 20 in the position to transmit, and gets the first binary word in the message that is to be converted to FSK format from the internal RAM. A message might comprise 2-16 8-bit words, each with a start and stop bit, depending upon the device with which module 10 is used. Since the first bit in the word is equal to a "0", the program logic branches to the left and enters a counting routine in which it waits for 99 machine cycles to elapse. Each machine cycle is a fixed period of time, the duration of which is determined by the time-base reference crystal 86 connected to microprocessor 11. In the preferred embodiment, the instruction cycle frequency is 238.6 kilohertz, and each machine cycle is 4.19 micro-seconds. After 99 machine cycles, microprocessor 11 complements the data output, i.e., changes from a high output to a low output or vice versa, for the second half cycle of the frequency being generated. It then checks to see if 8 half cycles of the carrier frequency are completed and if not, returns to wait for an additional 99 machine cycles to generate the next half cycle in the carrier frequency. After the 8 half cycles of the carrier frequency are completed, it checks to see if the last bit in the word to be transmitted is complete (i.e., have 10 bits been transmitted, the last bit being a stop bit), and if not, returns to the point where the next bit is checked to determine if it is a "0" or a "1". Assuming that the next bit is a "1", the machine logic waits for 53 machine cycles, complements the data output and checks to see if 15 half cycles of the carrier frequency are completed. If not, an additional 53 machine cycles pass before the data is again complemented. This is repeated until 15 half cycles of the carrier frequency are complete. After the 15 half cycles are complete and after the stop bit in the word is complete, the logic checks to see if the last word in the message has been transmitted, and if not, recycles for the next word. Finally, after the last word is transmitted, analog switches 19 and 20 are again switched to the receive mode and control logic exits transmit mode.

Figure 4:
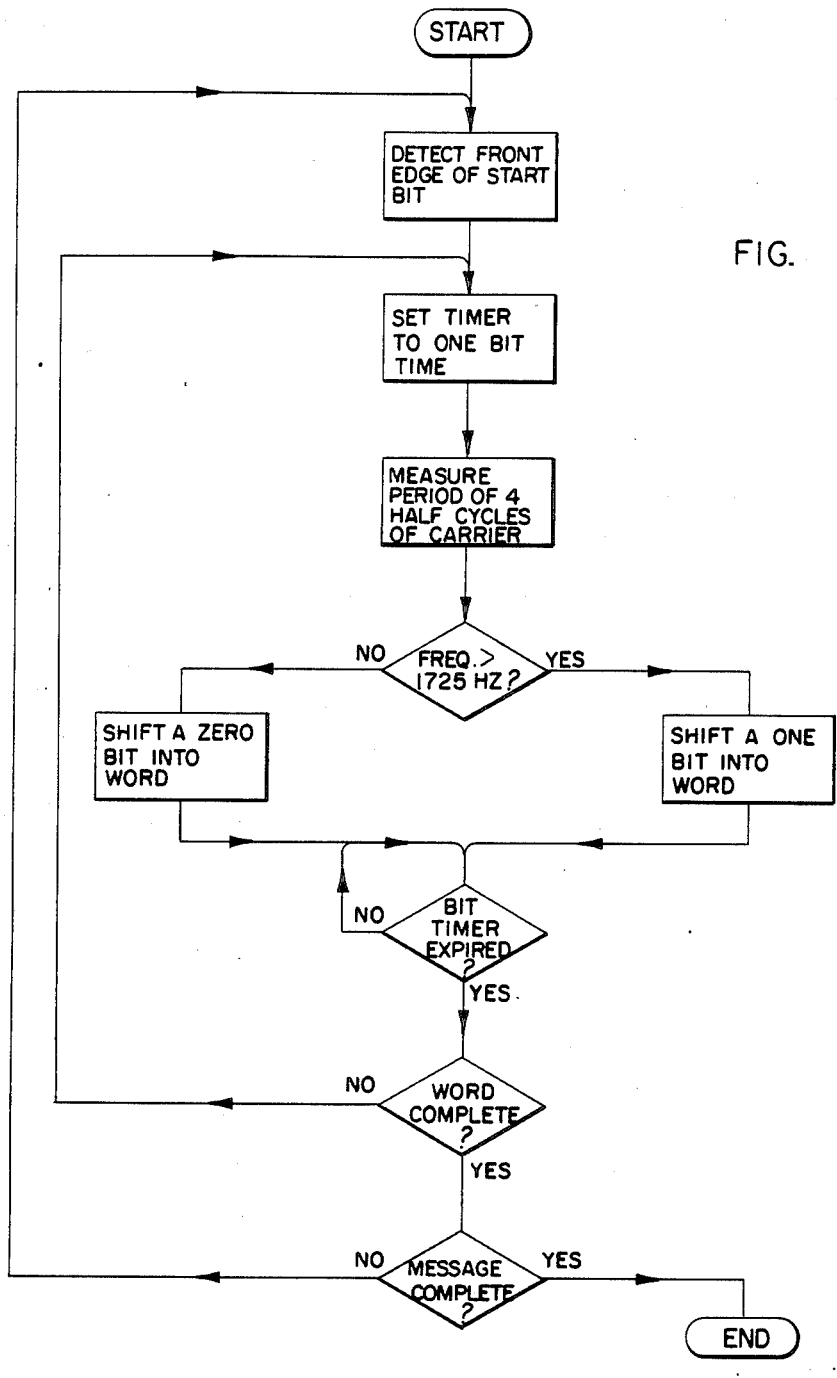
FIG. 4 is a flow chart illustrating the control logic used by the microprocessor in demodulating data.

Turning now to FIG. 4, logic stored in microprocessor 11 enters the receive mode as the result of the carrier detect signal input to port 16 going low in logic level, i.e., dropping from 5 volts to about 0.2 volts DC. The occurrence of a low voltage on input 16 vectors the program logic to detect the front edge of a start bit.

When data is transmitted in FSK format, the initial transmission is a mark, i.e., a "1". This is followed by a start bit, "0", that in turn is typically followed by eight bits comprising a word and a "1" stop bit. In detecting the front edge of a start bit, microprocessor 11 takes a running average of each half cycle according to the equation: AVG/2 + period/2 = New AVG where AVG/2 is the preceding average half cycle period divided by 2, and period/2 is the current half cycle period divided by 2. When New AVG exceeds a threshold that is 85% of the half cycle period for a start bit, the logic considers that the front edge of the start bit or a "0" bit has been detected.

The logic next sets an internal timer in microprocessor 11 to the period for one bit time, so that the front edge of the following bit in the transmission can be found. The next four half cycles of the carrier are measured in terms of period by counting instruction cycles in the microprocessor 11 that occur in each half cycle of the receive carrier. If the measured period of the four half cycles corresponds to a frequency that is greater than 1725 hertz, a one bit is shifted into the word being stored in internal RAM. If not, a "0" bit is shifted into the word. The frequency 1725 hertz is half-way between the carrier frequencies that correspond to a "1" bit and a "0" bit, respectively. After the appropriate number of half cycles for the particular bit that is detected have been received, the bit timer times out and the logic asks if the word being compiled in memory is complete. If not, logic cycles again to set the timer to a "1" bit time.

After the word is complete, the logic checks to see if the message is complete as determined by either a predefined format for message transmissions, or by information sent in a predesignated word transmitted to the communications module 10. If the message is not complete, the logic cycles to detect the front edge of the start bit for the next word transmission. Otherwise, logic exits the receive routine and proceeds with other functional activities for which microprocessor 11 may be programmed. If the carrier detect signal input on port 16 should go high at any time during the transmission receipt, the message being received is aborted, being considered suspect due to possible noise on the transmission line 17.

If a microprocessor 11 that is substantially faster than what is now currently available were used, it would be possible to modulate and demodulate data in FSK format directly as sine waves coupled to the transmission line 17 through transformer 18. However, bandpass filter 21 and limitor 22 provide a low-cost alternative wherein square wave signals may be modulated and demodulated by microprocessor 11. It is also possible to select other carrier frequencies and different baud rates for the transmission of data by changing the value of capacitors and resistors used in filter 21 and modifying the software program. The carrier frequencies used in the preferred embodiment were chosen to meet the commonly-used 300 baud standard, such that there are a full number of half cycles per bit, whether the bit is a "0" or a "1". In addition, the carrier frequencies are fixed multiples of the instruction cycle frequency. Furthermore, Bell Telephone Standard 203 specifies that carrier frequencies of 1200 and 2200 hertz are optimum with respect to the 300 baud rate. These frequencies are low enough for microcomputer 11 to modulate and demodulate, and have sufficient separation so that they are easy to differentiate in the receive mode.

Various other components may be used in building the circuit elements shown in FIG. 1, as or example, discrete transistors in place of operational amplifiers. These and other modifications will be apparent to those skilled in the art, and it should be understood that while the present invention has been described with respect to a preferred embodiment, such modifications lie within the scope of the present invention as defined in the claims which follow.

We claim:

1. A frequency shift keyed (FSK) data communications module adapted for a connection to a transmission line and selectively operable in both a receive and transmit mode said module comprising
   a. a microprocessor having a plurality of electrical connection pins for input and output, said microprocessor being used for modulating and demodulating square wave signals carrying data that are respectively transmitted and received in a frequency shift keying format on the transmission line, said microprocessor including a single pin input port and a single pin output port for receiving and sourcing the square wave signals;
   b. means for selectively coupling one of the input and output ports to the transmission line, which are operative to modify the FSK signal received thereon in the receive mode and to modify the square wave signals produced by the microprocessor in the transmit mode; and
   c. means for switching the coupling means between the input port and the output port whereby the coupling means can function in both the receive and transmit modes.

2. The FSK data communications module of claim 1 further comprising means for detecting the presence of a carrier on the transmission line, and generating a carrier detect signal that is input to the microprocessor, whereby upon receipt of the carrier detect signal, the module begins to operate in the receive mode so that the microprocessor can demodulate the incoming signal.

3. The FSK data communications sxdule of claim 1 wherein the coupling means comprise a transformer.

4. The FSK data communications module of claim 1 further comprising a zero crossing detector disposed between the switching means and the input port, said detector being operative to provide the square wave signal in phase with a receive FSK data signal to the input port of the microprocessor.

5. The FSK data communications module of claim 1 wherein the switch means comprise a first and a second electronic switch, actuated in response to a switching signal output from the microprocessor.

6. The FSK data communications module of claim 5 further comprising a bandpass filter disposed between the first and second switches and operative to filter out unwanted signals when the module is receiving data, and to wave shape an output signal when the module is transmitting data.

7. The FSK data communications module of claim 6 further comprising a summing amplifier electrically connected to the bandpass filter and the switching means, and in combination with the bandpass filter comprising a notch filter.

8. A FSK data communications module for receiving and transmitting FSK data on a transmission line, said module comprising
   a. a microprocessor including memory means for storing a program by which the microprocessor is caused to modulate a square wave output signal in a FSK data transmit mode and to demodulate a square wave input signal in a FSK data receive mode, the output signal being presented at a data output port and the input signal accepted at a data input port; said microprocessor also being operative to output a mode select signal and to accept and respond to a carrier detect signal indicative of an incoming signal present on the transmission line;
   b. a transformer used to couple the module to the transmission line;
   c. means electrically connected both to the transformer and to the microprocessor, for generating the carrier detect signal in response to an incoming FSK signal present on the transmission line;
   d. a bandpass filter; and
   e. a switching network connected between the transformer, the bandpass filter, the input port, and the output port, said switching network being responsive to the mode select signal to connect the output port to the transformer through the bandpass filter in the transmit mode, and to connect the input port to the transformer through the bandpass filter in the receive mode.

9. The FSK data communications module of claim 8 further comprising a notch filter electrically connected between the transformer and the means for generating a carrier detect signal.

10. The FSK data communications module of claim 9 wherein the notch filter comprises the bandpass filter and an amplifier.

11. The FSK data communications module of claim 8 further comprising a zero crossing detector connected to the input port of the microprocessor and through the switching means, to the bandpass filter when the module is in the receive mode, said zero crossing detector being operative to provide a square wave signal to the input port, that is in phase with a sine wave signal that passes through the bandpass filter from the transmission line.

12. A method of communicating digital information from one microprocessor to another over a transmission line using an FSK format, comprising the steps of
   a. generating square waves of predetermined frequencies in one of the microprocessor, as FSK pulses output at a port of said one micorprocessor, according to a stored program;
   b. filtering the output pulse square waves to produce sine waves of equivalent frequencies using a bandpass filter;
   c. electrically coupling the filtered output pulses to the transmission lines;
   d. detecting the presence of the sine wave FSK pulses on the transmission line by comparing the amplitude of the signals in the expected frequency band with the amplitude of the signal outside that band and generating a carrier detect signal input to the other microprocessor if the inband amplitude is greater, causing the other microprocessor to operate in a receive mode and to process the received FSK signal with the same bandpass filter used in a transmit mode;
   e. changing the sine wave FSK pulses to a square wave pulse signal of equal frequencies and coupling the square wave pulse signal to an input port on the other microprocessor; and
   f. demodulating the square wave FSK pulses received at the input port of said other microprocessor to interpret the digital information according to a stored program.

13. The method of claim 12 wherein the step of converting the sine wave FSK pulses to square wave FSK pulses of equivalent frequencies includes the step of using a zero crossing detector.

14. The method of claim 13 further including the step of filtering the sine wave FSK pulses input to the zero crossing detector using the bandpass filter.

15. A frequency shift keyed (FSK) data communications module, adapted for connection to a transmission line, said module comprising
   a. a microprocessor that modulates and demodulates data respectively transmitted and received in a frequency shift keying format on the transmission line, said microprocessor having a plurality of electrical connection pins for input and output including a single pin input port and a single pin output port for receiving and transmitting the data;
   b. a bandpass filter having an input and an output;
   c. a zero crossing detector having an input and an output, with its output connected to the input port of the microprocessor;
   d. a transformer having a first winding and a second winding with the first winding connected to the transmission line; and
   e. switch means controlled by the microprocessor for selectively coupling the input of the bandpass filter to the microprocessor output port and output of the bandpass filter to the second winding of the transformer in the transmit mode, and for selectively coupling the input of the bandpass filter to the second winding of the transformer and the output of the bandpass filter to the input of the zero crossing detector in a receive mode, whereby the bandpass filter is used in both the receive and transmit modes.

16. The FSK data communications module of claim 15 further comprising means electrically connected to both the second winding of the transformer and to the microprocessor for generating a carrier detect signal in response to an incoming FSK signal present on the transmission line, said carrier detect signal being input to the microprocessor and operative to cause the microprocessor to select the receive mode.

17. The FSK data communications module of claim 16 further comprising a notch filter electrically connected between the second winding of the transformer and the means for generating a carrier detect signal.

18. The FSK data communications module of claim 17 wherein the notch filter comprises the bandpass filter and an amplifier.

19. The FSK data communications modules of claim 15 wherein the bandpass filter is operative to filter out unwanted signals present on the transmission line when connected in the receive mode, and to wave shape an output signal when connected in the transmit mode.

20. The FSK data communications module of claim 15 wherein the switch means comprise a first and a second electronic switch.

* * * * *

UNITED STATES PATENT AND TRADEMARK OFFICE
CERTIFICATE OF CORRECTION

PATENT NO.  :  4,689,801
DATED       :  August 25, 1987
INVENTOR(S) :  Mark E. Nurczyk, Patrick J. Wilson, and Tony J. Wood It is certified that error appears in the above-identified patent and that said Letters Patent is hereby corrected as shown below:

In The Specification:

Column 5, line 54, "suning" should be -- summing --.

In The Claims:

Claim 3, column 9, line 6, "sxdule" should be -- module --.

Claim 12, column 10, line 11, "micorprocessor" should be -- microprocessor --.

Signed and Sealed this

Fifteenth Day of December, 1987

Attest:

DONALD J. QUIGG

*Attesting Officer*    *Commissioner of Patents and Trademarks*